United States Patent
Swamy

(10) Patent No.: US 12,170,841 B2
(45) Date of Patent: Dec. 17, 2024

(54) POWER REDUCTION FOR LEDS BASED ON INFRARED PULSING

(71) Applicant: Cisco Technology, Inc., San Jose, CA (US)

(72) Inventor: Ramkrishna Swamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 17/898,286

(22) Filed: Aug. 29, 2022

(65) Prior Publication Data

US 2024/0073517 A1 Feb. 29, 2024

(51) Int. Cl.
*H04N 23/65* (2023.01)
*H04N 5/33* (2023.01)
*H04N 23/73* (2023.01)
*H04N 23/74* (2023.01)

(52) U.S. Cl.
CPC ............. *H04N 23/651* (2023.01); *H04N 5/33* (2013.01); *H04N 23/73* (2023.01)

(58) Field of Classification Search
CPC ........ H04N 23/651; H04N 5/33; H04N 23/73; H04N 23/20–23; H04N 23/74
USPC .......................................................... 348/370
See application file for complete search history.

(56) References Cited

U.S. PATENT DOCUMENTS

| | | | |
|---|---|---|---|
| 2002/0041166 A1* | 4/2002 | Grubisic | A61B 5/14546 315/363 |
| 2006/0238617 A1 | 10/2006 | Tamir | |
| 2009/0148148 A1* | 6/2009 | Tanaka | G03B 7/00 396/213 |
| 2011/0081142 A1* | 4/2011 | Tsai | H04N 23/74 396/173 |
| 2011/0261209 A1* | 10/2011 | Wu | G03B 15/05 348/371 |
| 2012/0123213 A1* | 5/2012 | Seto | A61B 1/0653 315/297 |
| 2012/0217889 A1* | 8/2012 | Jayabalan | H05B 45/14 315/209 R |
| 2013/0002882 A1* | 1/2013 | Onozawa | G01S 7/4863 348/E5.09 |

(Continued)

FOREIGN PATENT DOCUMENTS

JP 2017184151 A 10/2017

OTHER PUBLICATIONS

International Search Report and Written Opinion for International Application No. PCT/US2023/072622, mailed Dec. 4, 2023, 13 Pages.

*Primary Examiner* — Anthony J Daniels
(74) *Attorney, Agent, or Firm* — Polsinelli P.C.

(57) ABSTRACT

A system is provided for reducing infrared (IR) light emitting diode (LED) power in a night mode for LED operations. The system may include an input power source, one or more LEDs coupled to the input power source, an auto-exposure controller (AEC) coupled to one or more LEDs, and one or more transistor switches coupled between the one or more LEDs and the AEC. The AEC may be coupled to an image sensor of an imaging system and may configure attributes of exposure frames for the image sensor. The AEC may generate a plurality of pulses that control one or more transistor switches. The AEC may execute an algorithm that synchronizes the activation of one or more LEDs to occur during the exposure frame.

14 Claims, 8 Drawing Sheets

(56) References Cited

U.S. PATENT DOCUMENTS

| | | | |
|---|---|---|---|
| 2013/0141635 A1* | 6/2013 | Lebens | H05B 47/10 |
| | | | 348/370 |
| 2013/0235551 A1* | 9/2013 | Hamada | H04N 23/74 |
| | | | 362/11 |
| 2014/0027606 A1* | 1/2014 | Raynor | G06F 3/017 |
| | | | 250/208.1 |
| 2014/0203170 A1* | 7/2014 | Ono | A61B 1/0661 |
| | | | 250/208.1 |
| 2015/0373796 A1* | 12/2015 | Bahrehmand | H05B 45/325 |
| | | | 315/129 |
| 2016/0072990 A1 | 3/2016 | Dinev | |
| 2016/0150612 A1 | 5/2016 | Beausoleil et al. | |
| 2016/0241765 A1* | 8/2016 | Walters | H04N 7/183 |
| 2017/0104939 A1* | 4/2017 | Sun | H04N 25/75 |
| 2019/0174042 A1* | 6/2019 | Johannessen | H04N 23/60 |
| 2019/0246025 A1 | 8/2019 | Duran et al. | |
| 2019/0394380 A1 | 12/2019 | Van Look et al. | |
| 2022/0103737 A1 | 3/2022 | Mochizuki | |

\* cited by examiner

POWER REDUCTION FOR LEDS BASED ON INFRARED PULSING

FIELD

The present application relates to the control of infrared (IR) light-emitting diodes (LEDs) using IR pulsing during night mode operations. More particularly, the present application relates to systems and methods for synchronizing IR pulsing with exposure frames of image sensors.

BACKGROUND

Security cameras or videos are usually mounted in some corners of a building or a room and due to their location, the camera may have near objects and far objects in the field of view (FOV). Low light scenes require an active lamp or illuminator flashlight to brighten the scenes. IR LEDs (e.g., wavelengths of 850 nm and 940 nm) are often used to illuminate the scenes. The image sensors of the security cameras receive reflected lights from objects in the scenes and display images. The night mode operations rely on the amount of perceivable light hitting the image sensor. In the absence of visible light in the night mode operations, the scene can be actively illuminated with infrared (IR) light using IR LEDs. The more infrared power pumped into the scene, the more reflected light from the scene can be sensed by the camera image sensor, which may improve the signal-to-noise ratio (SNR) and get an appealing or usable image of the scene.

Security cameras or videos commonly run 24 hours and seven days per week. Each coverage site may need many cameras to meet the customer's needs. Many security cameras today adhere to 802.3af or 802.3at standards, which make the cameras capable of using up to 25.5 W per camera. For example, some cameras use on average 10 W to about 17 W.

A large portion of the power is allocated to IR LEDs, which are needed for low-light environments such as night vision. For security cameras or videos outdoors, a third of the day may be in low light conditions, which means little or no light. For security cameras or videos indoors, about 50% of the day may be in low light conditions. In a single camera with 24/7 operation, about 50% of the captured videos have active illumination. In one example model of camera, it consumes 15 W of which about 7 W is consumed when operating in low light conditions, which is about 46% of the power used for IR LEDs. Hence, optimization of the night vision or night mode operations is important for overall power efficiency, thermal design and management, and product reliability.

Linearly increasing IR power may decrease the output efficiency of the LEDs. Linearly increasing IR power with poor efficiency may not help with thermal product design. For example, the current power usage during night mode operations of 12 hours of night-time viewing would need the energy of 3-12 W multiplied by 12 hours, which equals 36-144 Wh. Also, linear increase is not sustainable. Therefore, there exists a need for a change in night mode IR power consumption.

BRIEF DESCRIPTION OF THE DRAWINGS

To describe how the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
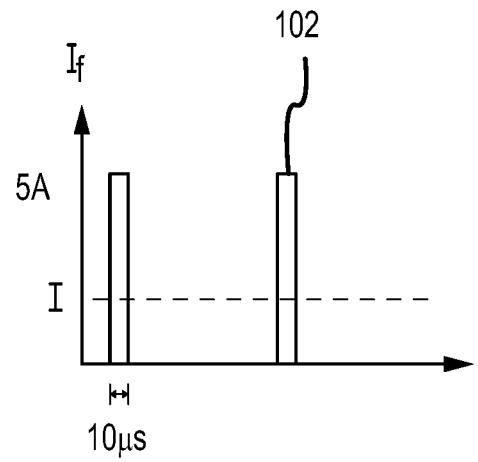
FIG. 1A depicts a plurality of very short and high current pulses for IR pulsing in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment, and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained utilizing the instruments and combinations particularly pointed out in the appended claims. These and other features of the disclosure will become more fully apparent from the following description and appended claims or can be learned by the practice of the principles set forth herein.

Overview

In one aspect, a system is provided for reducing infrared (IR) light emitting diode (LED) power in a night mode for LED operations. The system may include an input power source, one or more LEDs coupled to the input power source, and an auto-exposure controller (AEC) coupled to one or more LEDs. The system may also include one or more transistor switches coupled between one or more LEDs and the AEC. The AEC may be coupled to an image sensor of an imaging system and configures attributes of exposure frames for the image sensor. The attributes may include a beginning of sensor exposure and an end of sensor exposure for image frames captured by the image sensor. The AEC may be configured to generate a plurality of pulses that control one or more transistor switches. The AEC may execute an algorithm that synchronizes an activation of one or more LEDs to occur during the exposure frame and disables the activation of one or more LEDs during vertical blanking periods of the image frames. The one or more transistor switches may be configured to switch the power of the one or more LEDs for a time measured in nanoseconds and allow a high current to pass through the one or more LEDs causing the one or more LEDs to produce a pulse of light during the exposure frames.

In another aspect, a method is provided for reducing power consumption in night mode for a security camera. The method may include determining exposure frame parameters for an image frame of an image sensor of the security camera. The method may also include synchronizing an activation of one or more LEDs to occur during the exposure frame, but not during a vertical blanking period of the image frame.

In a further aspect, a method is provided for reducing infrared (IR) light emitting diode (LED) power in a night mode for LED operations. The method may include modulating one or more LEDs by pulse-width modulation (PWM) or pulse-density modulation (PDM) by a controller. The method may also include disabling the activation of one or more LEDs during vertical blanking periods of image frames by the controller.

Example Embodiments

IR pulsing has been used for IR LEDs, which can produce intense light for a short period, i.e., for a short pulse. Flashlights have been used for flash camera photography on digital single-lens reflexes and cell phones, such as xenon flashes immediately before the image capture. However, IR LED lights with IR pulsing have not been used with videos (e.g., in a security camera setting). There is no combination of IR pulsing used with a shutter (e.g., rolling shutter or global shutter) in a single product due to the thermal challenges, a growing power budget, and the difficulty of having both IR pulsing and the shutter in one form factor.

The image sensors have vertical blanking during which internal operations can be preformed, but the image sensor is not active to capture an image. The vertical blanking has a time between the end of the final visible line of a frame and the beginning of the first visible line of the next frame. If IR LEDs are operational during the vertical blanking or horizontal blanking, power is then wasted.

The present technology addresses the needs in the art for reducing power consumption for IR LEDs during night mode operations. The power can be reduced by only activating the IR LEDs when the image sensor is active to capture an image. In some embodiments, the night mode IR power is reduced based on disabling IR LEDs during vertical blanking. In some embodiments, the night mode IR power is reduced by coordinating high current IR pulses with periods when the shutter is open.

The present technology provides pulse-width modulation (PWM) or power-density modulation (PDM) plus disabling IR LEDs during vertical blanking to help save power. PWM can provide smaller short pulses and high currents without heating the LED. The PWM circuit is turned off in the vertical blanking as there is usually a 15-20% pad time placed for sensor readout among many things. This means that the same performance can be achieved but with some power savings of about 15 to 20%. Slow rates of operations may not benefit from this method. For example, a frame rate of 5 frames-per-second (fps) may not benefit as the exposure time would limit frame time. Also, PWM has a problem with pulsing at a particular frequency.

The present technology also provides high current pulses on the IR LEDs to generate very high lumen counts. Then the LEDs have a cool-down period before the process is repeated. Power consumed by the LED can be reduced by disabling IR pulsing during vertical blanking. The LED power can further be reduced based on IR pulsing synchronization with sensor exposure times. More specifically, the present technology pertains to combining the shutter, either the global shutter that captures the entire frame at the same instant or the rolling shutter, and IR pulsing with synchronization of the signals to the image data in a single product. The synchronization can still be utilized for rolling shutter and global shutter and with LEDs of much higher power if it is done on a separate product. The present technology combines the shutter and IR LED pulsing in a single product by using a synchronization circuit, i.e., synchronization of the IR pulses with the exposure frame of an image captured by an image sensor.

The present technology provides the IR pulsing implementation including two parts: (1) hardware that supports high peak currents (e.g., 5 A to 10 A) with n-channel metal-oxide-semiconductor (NMOS) transistors or switches, such as metal-oxide-semiconductor field-effect transistors (MOSFETs) and (2) methods for triggering signals from the image sensor or image signal processor (ISP) to allow synchronizing with the exposure or shutter times of the image sensors.

With a series of flash pulses, more than 95% of IR power reduction can be achieved for the same light output. In other words, the light output can be increased for the same average IR power used. The present technology provides many benefits including improved thermal design, smaller form factor, less e-waste or material, improved clusters of orthologous groups (COGS), less heat dissipation, more stability, better performance, and better for the planet, among others.

LEDs may have two different operation modes, i.e., quasi-continuous wave (QCW) mode and pulse mode. Optical parameters of light emitting diodes may strongly depend on the operation regime, such as driving current, voltage, and pulse width.

In the QCW mode, an LED is switched on for certain time intervals, which are short enough to reduce thermal effects significantly, but still long enough that the LED process is close to a steady state. To receive maximum average power, pulse modes with a duty cycle of 50% (quasi-continuous wave mode) or a duty cycle of 25%. The QCW mode provides signal modulation at a certain frequency and allows obtaining higher output intensity than in the case of using the continuous wave mode. The frequency of the drive current pulse may range from 0.5 to 16 kHz. For example, the driving current may range from 0 to 250 mA, and the pulse width may range from about 30 to 1000 µs.

In a pulse mode, an LIED is switched on and off with a short pulse time (less than 50 ms), which helps obtain the maximum peak power. The frequency of the driving current may range from 0.5 to 16 kHz, which may be the same as the QCW mode. However, the driving current of the pulse mode may range from 0 to 10 A, which is much higher than the QCW mode. The pulse width of the pulse mode may range from about 0.6 to 20 µs, which is much shorter than the QCW mode.

Although IR wavelengths are discussed above, the disclosed technology can be extended to any wavelength of light except visible wavelengths because flashes will be visible to humans.

IR Pulsing Combined with Rolling Shutters and Global Shutters

The present technology disables IR pulsing during vertical blanking and uses FR pulsing synchronizing with exposure windows or exposure frames, which may potentially reduce current by about 90% for similar lighting during night mode operations. Also, power improvement may be as high as 90% reduction due to duty cycle reduction. For example, the energy usage of 36 to 144 Wh (watt-hour) can be reduced to the energy usage of 3.6 to 14.4 Wh.

IR pulsing has no dimming. IR pulsing uses high current pulses. Most IR LEDs may be limited to a low speed, such as 300 pps (pulse per second). Hence, a 30 fps (frame per second) mode may correspond to about 10 pulses per frame, which means that each pulse carries a high photon count when the IR LEDs light up. Also, the variation per pulse can be seen as an exposure variation (may be banding, flashing from frame to frame, etc.). The intensity of the pulse can be tightly controlled during the system design. For example, the IR pulses can be generated evenly spaced across the exposure frame such that the number of pulses remains the same for the integrated rows for a rolling shutter, which may require synchronizations with the image sensor. If banding does occur, the system can dynamically adjust the LED current to improve the image quality.

The rolling shutter is the most common type of shutter found in mobile phones and digital cameras and the majority of video cameras. These cameras contain active-pixel sensors (CMOS), which typically employ rolling shutters to capture images. The rolling shutter allows recording the frame line by line on an image sensor instead of capturing the entire frame all at once. The rolling shutter sensor scans from the top of the image to the bottom, so the top of the frame is recorded slightly earlier than the bottom. The rolling shutter sensor is not exposed entirely. An exposure window or frame moves horizontally across a row from the top to the bottom.

It is more economically feasible to produce the rolling shutter. It is also easier to build complex electronics directly into the CMOS, which has been used in smartphones and digital cameras. In addition, the dynamic range is much wider in the rolling shutter than in the global shutter. The dynamic range is the luminous intensity range or limits of the range when taking a photo or capturing an image. A wide-dynamic range indicates that the final image may present closer to a true-life vision of the scene and may preserve nearly all of the dynamic range even in harsh lighting. The wide-dynamic range may reduce the risk of blow-out between the sun and the edge of buildings.

IR pulsing is different from PWM because of instantaneous currents (e.g., very short current pulses) used in IR pulsing. PWM uses DC currents of the LED to vary the duty cycle. As such, a dimming feature can be achieved by the PWM. However, IR pulsing achieves a very high light intensity and cannot dim like PWM.

IR pulsing is also different from pulse density modulation (PDM), which can enable pulsing plus dimming. PDM can have some challenges, such as illumination consistency, LED intrinsic temperature and many other system factors, and latency or auto-exposure synchronizing.

FIG. 1A depicts a plurality of very short and high current pulses for IR pulsing in accordance with some aspects of the disclosed technology. As illustrated in FIG. 1A, IR pulses 102 may have a high current, such as 5 A, which is much higher than LED operated in the QCW mode. The pulses have a constant peak value of current or voltage. It will be appreciated by those skilled in the art that the current may vary from 2 A to 10 A.

Figure 1B:
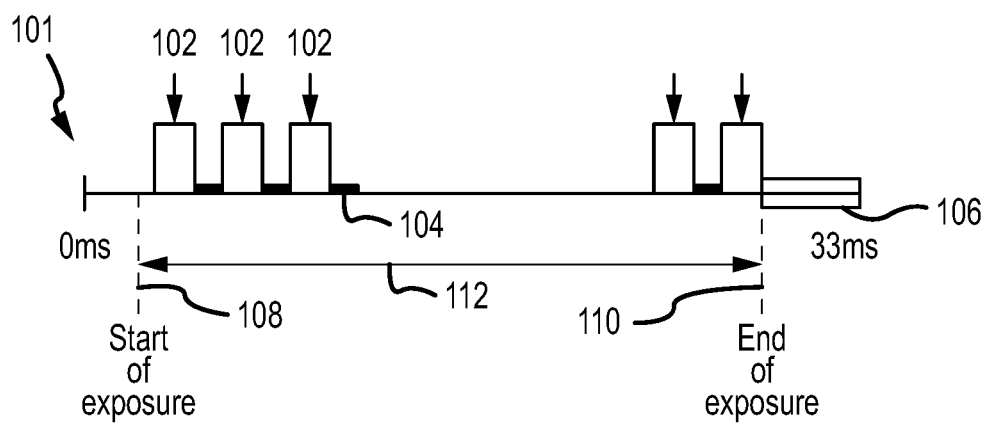
FIG. 1B depicts a plurality of pulses within an exposure frame of an image sensor but not during vertical blanking in accordance with some aspects of the disclosed technology.

FIG. 1B depicts a plurality of pulses within an exposure frame of an image sensor but not during vertical blanking in accordance with some aspects of the disclosed technology. As illustrated in FIG. 1B, an image frame 101 includes an exposure frame 112 and vertical blanking 106, and several line exposures 102 with a horizontal blanking between two neighboring line exposures 102. Several line exposures 102 are within the exposure frame 112. The first line exposure 102 is aligned with an exposure frame 112, i.e., the beginning 108 of the sensor exposure frame 112. The last line exposure 102 may end right before the end 110 of the sensor exposure frame 112. There are also no line exposures during vertical blanking 106.

The IR pulses are generated at the same time interval as the line exposure time 102. The IR pulses may help reduce the power consumption of the LEDs. Therefore, the LEDs are turned off during the vertical blanking 106, for example, 33 ms. In other words, there are no pulses during the vertical blanking 106. Also, the pulse width of LR pulses cannot be shorter than the time of the line exposure 102 of the image sensor.

The present technology provides how to determine the spacing of the exposure window, which may contain an equal number of IR pulses in each of the exposure windows or exposure frames where the IR pulses can be widely spaced for synchronization.

Figure 2:
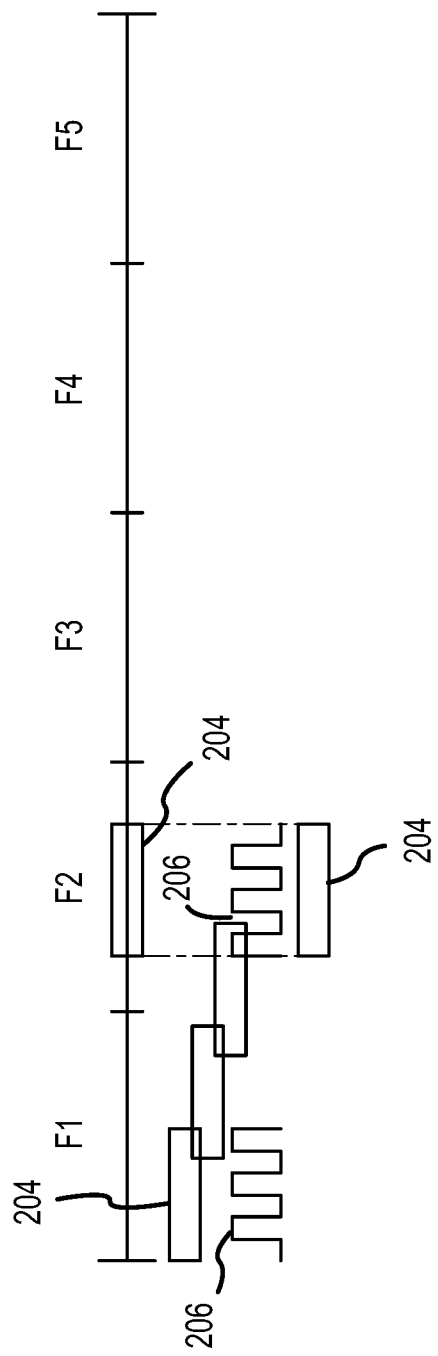
FIG. 2 depicts exposure frames moving relative to image frames and IR pulses aligned with the exposure frames in accordance with some aspects of the disclosed technology.

FIG. 2 depicts exposure frames moving relative to image frames and IR pulses aligned with the exposure frames in accordance with some aspects of the disclosed technology. Five (5) image frames F1, F2, F3, F4, and F5 are illustrated in FIG. 2. The rolling shutter sensor is not exposed entirely. An exposure window or frame 204 moves horizontally across a row from the top to the bottom. Exposure frame 204 or exposure window 204 moves to the right relative to the first image frame F1. If the rolling shutter sensor operates at 30 Hz or 30 fps, the rolling shutter occurs ⅓₀ per second. If the rolling shutter sensor operates at 10 fps, the rolling shutter occurs ⅒ per second or 0.1 seconds, such that tens of images are captured at slightly different times.

As illustrated in FIG. 2, for each image frame, there is an exposure window or exposure frame, or exposure period, which is shorter than the period of the image frame. In the first image frame F1, the first pulse is not aligned with the exposure frame 204. When the exposure frame 204 moves to a second image frame F2, the first of the three pulses 206 is aligned with the exposure frame 206 in the second image frame F2. This alignment of the first pulse 204 with the exposure frame 206 represents the synchronization of the pulsing with the sensor exposure. This alignment can be determined based on the latency between the exposure frame and the IR pulses for illuminating LEDs. The latency includes the delay between the exposure frame of the image sensor and the illumination of LEDs. The latency includes the delay between commanding the LEDs to fire and its actual illumination of the scene. The alignment ensures that the LEDs can illuminate the scene when the shutter opens.

Figure 3:
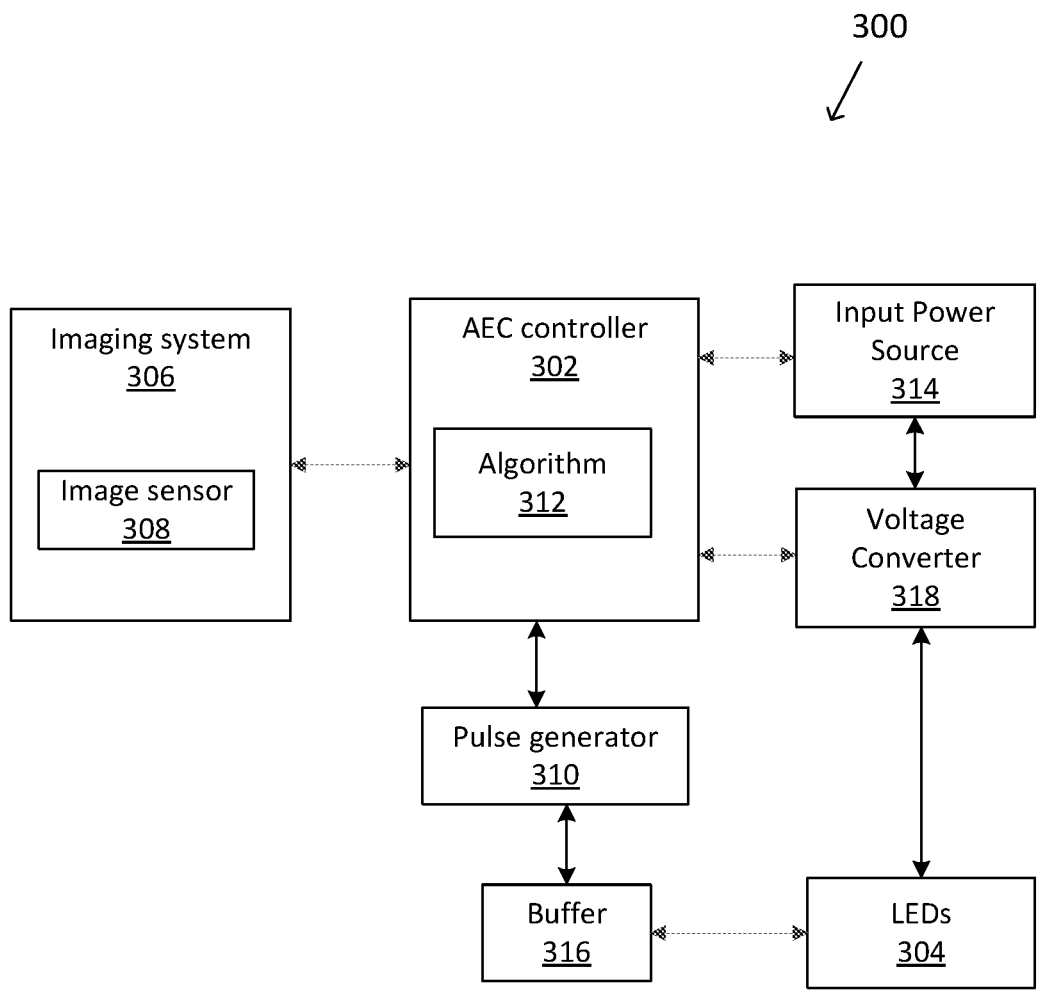
FIG. 3 is a system diagram including a controller for auto-exposure control (AEC) for IR pulsing implementation in accordance with some aspects of the disclosed technology.

FIG. 3 is a system diagram including a controller for auto-exposure control (AEC) for pulsing implementation in accordance with some aspects of the disclosed technology. A system 300 implements IR pulsing and tightly couples the IR pulses with the sensor exposure times and ensures each frame includes the same number of IR pulse. The system 300 may include a controller 302 which may be coupled to LEDs 304. The controller 302 may include an algorithm 312 for controlling LEDs 304. The controller 302 may execute algorithm 312 that disables the activation of the LEDs 304 during vertical blanking periods of the image frames. The controller 302 may execute algorithm 312 that synchronizes the first pulse with the beginning of the sensor exposure of the exposure frames based on the latency between the exposure frame of the image sensor and when the IR LEDs illuminate the scene. The exposure frame or rolling window moves when a pulse generator 310 is fired to generate pulses, and when the pulses go through buffers 316 for changing current and/or voltage of the pulses and transistor switches 320 for turning on the LEDs with the pulses. Thus, the latency or delay needs to be compensated when aligning the pulses with the exposure frame or the rolling window, so that the pulses synchronize with the exposure frame and then the IR LED is illuminating the scene when the exposure frame is active.

In some variations, the algorithm may include auto-exposure algorithms. The implementation may optionally include synchronizing with auto-exposure algorithms.

The system 300 may also include imaging system 306 including image sensor 308 coupled to the controller 302. The controller 302 may also control the exposure parameters of the image sensor 308 and the lighting of the LEDs 304. In some variations, the imaging system may include a security camera or a security video.

The system 300 may also include input power sources 314 for providing power to the LEDs 304. In some variations, the input power source may include one alternating current (AC) power source, a direct current (DC) power source, or a power-over-internet (POE) adapter.

The system 300 may also include voltage converters 318, which may be coupled between the input power sources 314 and the LEDs 304. The voltage converters may be coupled to the input power sources 314 to convert the voltage from an input voltage to a voltage that can activate the LEDs 314.

The system 300 may also include pulse generators 310 for generating very short and high current pulses, which are provided to LEDs 304 to help reduce power consumption. The LEDs are synchronized with the exposure or shutter times of the image sensors. In some variations, the pulse generators 310 may include a first pulse generator configured to generate a first subset of the plurality of pulses having a first frequency and a second pulse generator configured to generate a second subset of the plurality of pulses having a second frequency.

The system 300 may also include buffers 316, which may be coupled between the pulse generators 310 and the LEDs 304. The buffers 316 can change the current and/or voltage to the appropriate level for the LEDs 304. The system 300 is dependent on getting synchronization.

The system 300 may include transistor switches 320 for controlling the LEDs 304 using the IR pulsing generated from the pulse generator 310. In some variations, the transistor switches 320 may include n-channel metal-oxide-semiconductor (NMOS) transistors or metal-oxide-semiconductor field-effect transistors (MOSFETs).

In some variations, the high current combined with a plurality of pulses may provide each of the one or more LEDs with adequate power.

In some variations, the high current may range from 2 A to 10 A.

In some variations, the high current may range from 3 A to 10 A.

In some variations, the high current may range from 4 A to 10 A.

In some variations, the high current may range from 5 A to 10 A.

In some variations, the plurality of pulses may be evenly spaced to obtain a constant number of pulses within the exposure frames.

In some variations, the plurality of pulses may have constant width of the pulses and be spaced adequately to allow cooling of the LEDs.

In some variations, the imaging system may include a security camera or a security video.

The controller 302 also controls the activation of the LEDs 304 to occur during the exposure frame and ensures that the LEDs 304 are off during the vertical blanking interval. The controller 302 aligns the first pulse with the start of the exposure frame, controls the LEDs 304 to get the amount of light during the exposure frame, and ensures that the amount of light in each exposure frame in the video is roughly the same.

Figure 4:
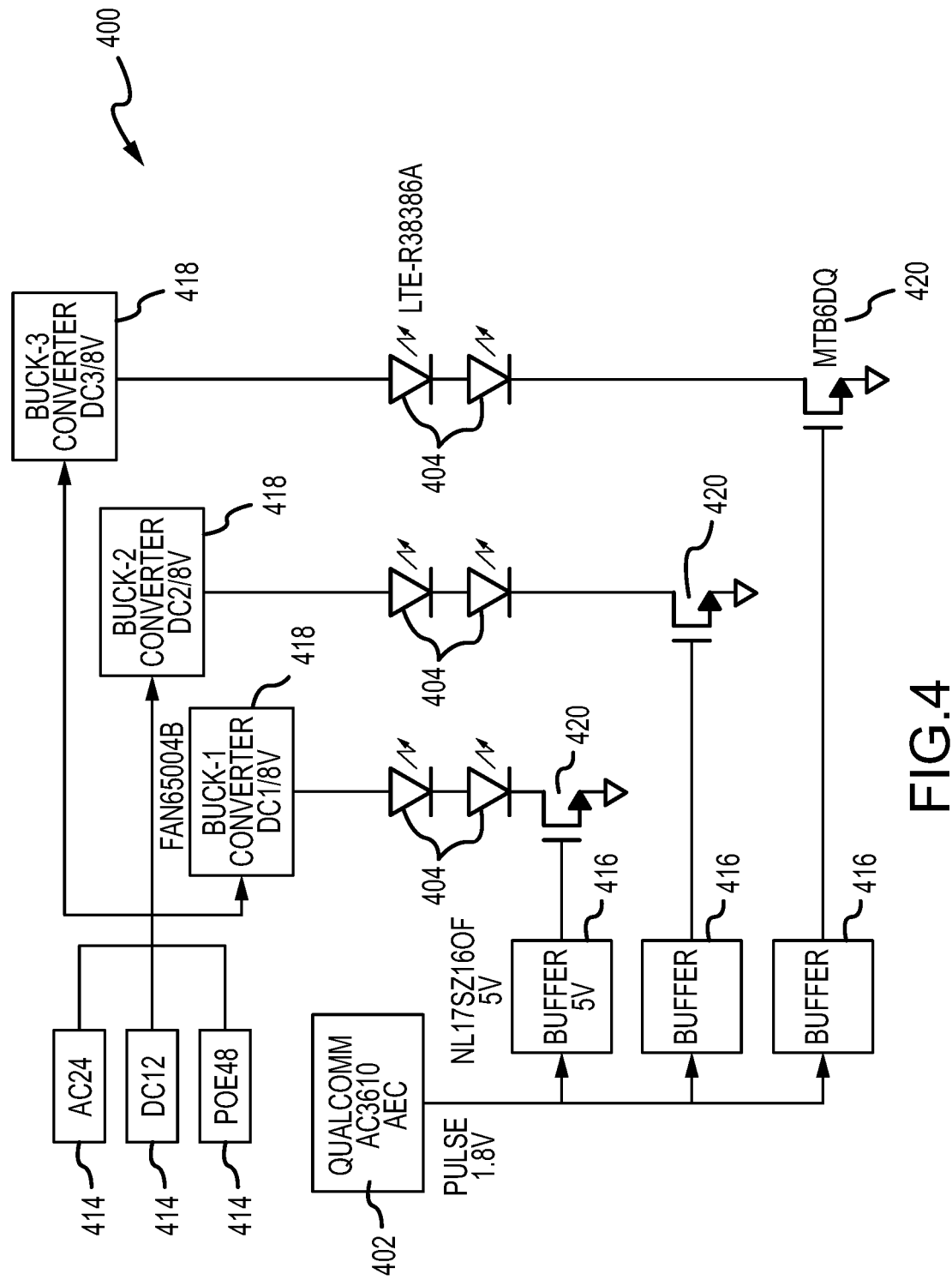
FIG. 4 is a system-on-chip (SoC) diagram including a controller and particular components for auto-exposure control (AEC) for IR pulsing implementation in accordance with some aspects of the disclosed technology.

FIG. 4 is an example system-on-chip including a controller and particular components for auto-exposure control (AEC) for IR pulsing implementation in accordance with some aspects of the disclosed technology. As shown in FIG. 4, a system-on-chip (SoC) 400 can have a 5 A peak current draw down each of the LED chains. The SoC 400 is an integrated circuit or chip that integrates all or most components including controller 402 and LEDs 404. For example, the AEC may be Qualcomm QLS610.

The SoC 400 may include three LEDs 404 and three converters 418 (e.g., Buck-1 converter DC1/8V, Buck-3 converter DC2/8V, and Buck-3 converter DC3/8V). Each of the three converters may be coupled to one of the three input-power sources 414, such as AC 24, DC 12, or POE 48. For example, the converters 418 may be FAN65004B, which may reduce the voltage to 8 V from one of the input-power sources 414, e.g., reducing 24 V from AC24, 12 V from DC12, or 48 V from POE 48) to 8 V.

The SoC 400 may also include a pulse generator (not shown) for generating a pulse of 1.8 V. The SoC 400 may also include buffers 416 for increasing the pulse voltage or current. For example, the buffers may be NL17SZ160F, which may increase the pulse voltage from 1.8 V to 5 V.

In some variations, the buffers may change the current from the pulse generator to the current appropriate to operate the LEDs.

In some variations, the buffers may change the voltage from the pulse generator to the voltage appropriate to operate the LEDs.

The SoC 400 may include transistor switches 420 for controlling the LEDs 404 using the IR pulsing generated from the pulse generator. In some variations, the transistor switches 420 may include NMOS transistors, such as MOSFETs. For example, the switches 420 may be MTB6D0.

Figure 5:
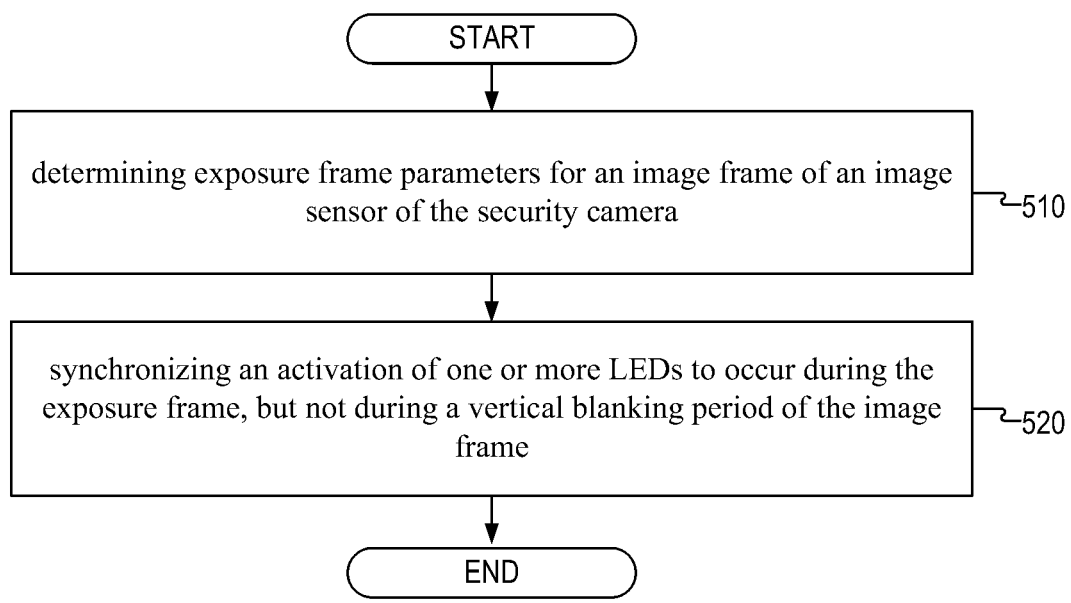
FIG. 5 is a flow chart illustrating steps using IR pulsing in accordance with some aspects of the disclosed technology

FIG. 5 is a flow chart illustrating steps using IR pulsing in accordance with some aspects of the disclosed technology. Although the example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements method 500 may perform functions at substantially the same time or in a specific sequence.

According to some examples, method 500 may include determining exposure frame parameters for an image frame of an image sensor of the security camera at block 510. For example, the controller 302 or 402 in FIG. 3 or FIG. 4 may determine exposure frame parameters for an image frame of the image sensor of the security camera.

In some variations, method 500 may also include generating a plurality of IR pulses of high current by an AEC controller including a pulse generator. Method 500 may also include determining latency between an exposure frame of an image sensor and a first of the plurality of IR pulses.

According to some examples, method 500 may include synchronizing an activation of one or more LEDs to occur during the exposure frame, but not during a vertical blanking period of the image frame at block 520. For example, the controller 302 or 402 in FIG. 3 or FIG. 4 may synchronize activation of one or more LEDs to occur during the exposure frame, but not during a vertical blanking period of the image frame.

In some variations, method 500 may also include synchronizing the plurality of IR pulses with one or more exposure frames of the image sensor based on the latency.

In some variations, the plurality of IR pulses is evenly spaced to obtain a constant number of IR pulses within the exposure frames. Also, the switch transistor is configured to switch in nanoseconds and allows the high current to pass through.

In some variations, synchronizing the plurality of IR pulses with one or more exposure frames of the image sensor may include aligning a beginning of sensor exposure of one or more exposure frames of the image sensor with the first one of the plurality of IR pulses.

In some variations, method 500 may also include increasing the number of pulses when the size of the exposure frames increases or decreasing the number of pulses when the size of the exposure frames decreases.

In some variations, method 500 may also include disabling the pulses during vertical blanking of the image sensor.

It will be appreciated by those skilled in the art that the IR pulsing can also be synchronized with the global shutters. The global shutters have been used in cameras. The global shutters can work either by abruptly exposing and then obstructing all photo sites at once. The global shutters are also referred to as "electronic shutters." Using the global shutters, all pixels within the frame of the lens are captured at the same moment. The global shutter sensor in the camera is exposed to light in one single moment, typically about 1/10th of a second (0.1 seconds). This means that the global shutter sensor is capturing the whole image in one moment. The advantages of global shutter sensors may include high frame rates, high resolution, clear images, even for very short exposures, outstanding noise characteristics, even in poor lighting conditions, broad dynamic range, and high quantum efficiency of up to 70%, among others.

PWM or PDM Combined with Global Shutters

Figure 6:
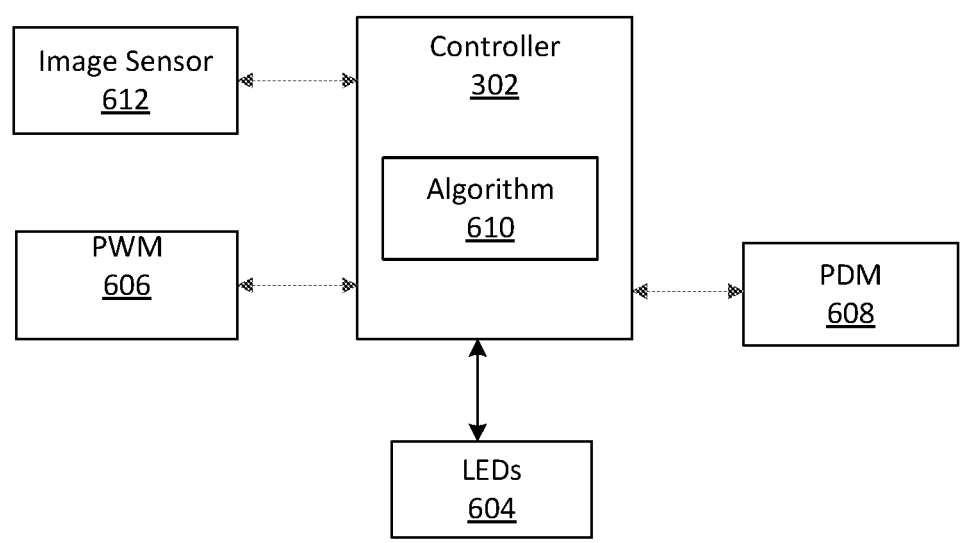
FIG. 6 is a diagram illustrating a controller for PWM or PDM that controls LEDs and disables IR LEDs during vertical blanking in accordance with some aspects of the disclosed technology.

FIG. 6 is a diagram illustrating a controller for PWM or PDM that controls LEDs and disables IR during vertical blanking in accordance with some aspects of the disclosed technology. As illustrated in FIG. 6, a controller 602 may be coupled to PWM 606 for controlling LEDs 604. The PWM may be aligned with image frames, or the global shutter. The controller 602 may include an algorithm 610, which controls the LEDs to disable during vertical blanking periods of an image sensor 612. The controller 602 may also be coupled to PDM 608 for controlling the LEDs 604. The PDM 608 may be synchronized with the exposure frame of the image sensors, or the global shutter.

Sources of variation that may vary among other auto-exposure-related artifacts, include: (1) LED intensity variation during ON time (either DC or PWM) as the LED intensity varies with temperatures (external and intrinsic), (2) Faster PWM frequency may lower the average current, hence less likely that each pulse variation (PWM or DC ON) will change exposure since intensity is less per pulse.

Figure 7:
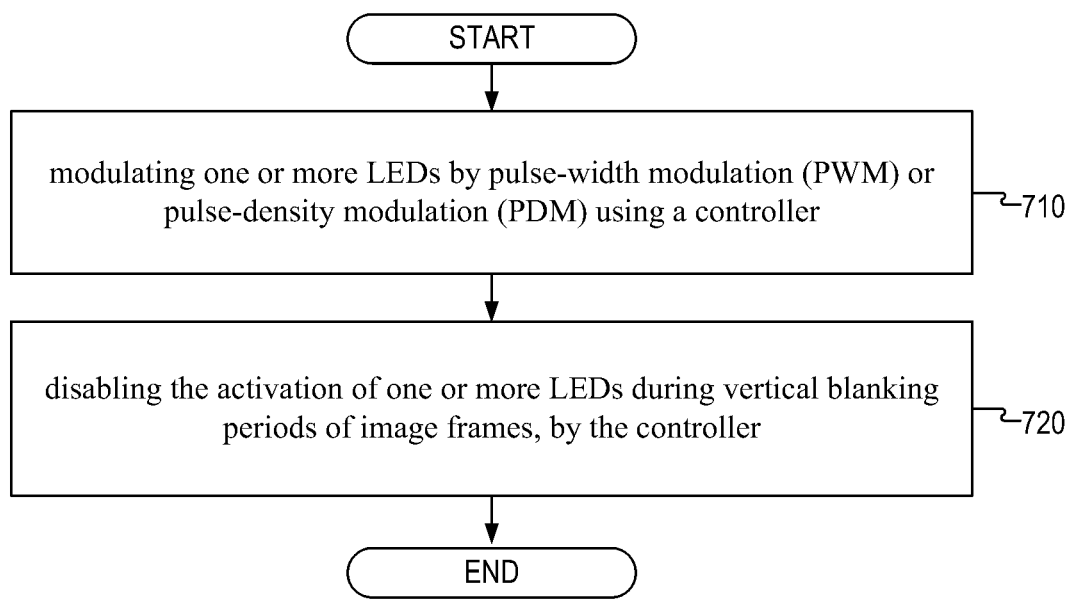
FIG. 7 is a flow chart illustrating steps using PWM or PDM with disabling IR during vertical blanking in accordance with some aspects of the disclosed technology.

FIG. 7 is a flow chart illustrating steps using PWM or PDM with disabling IR during vertical blanking in accordance with some aspects of the disclosed technology. Although the example method 700 depicts a particular sequence of operations, the sequence may be altered without departing from the scope of the present disclosure. For example, some of the operations depicted may be performed in parallel or in a different sequence that does not materially affect the function of method 700. In other examples, different components of an example device or system that implements method 700 may perform functions at substantially the same time or in a specific sequence.

According to some examples, method 700 may include modulating one or more LEDs by pulse-width modulation (PWM) or pulse-density modulation (PDM) at block 710. For example, controller 602 illustrated in FIG. 6 may modulate one or more LEDs by pulse-width modulation (PWM) or pulse-density modulation (PDM).

According to some examples, method 700 may include disabling the activation of one or more LEDs during vertical blanking periods of image frames at block 720. For example, controller 602 in FIG. 6 may disable the activation of one or more LEDs during vertical blanking periods of image frames.

Figure 8:
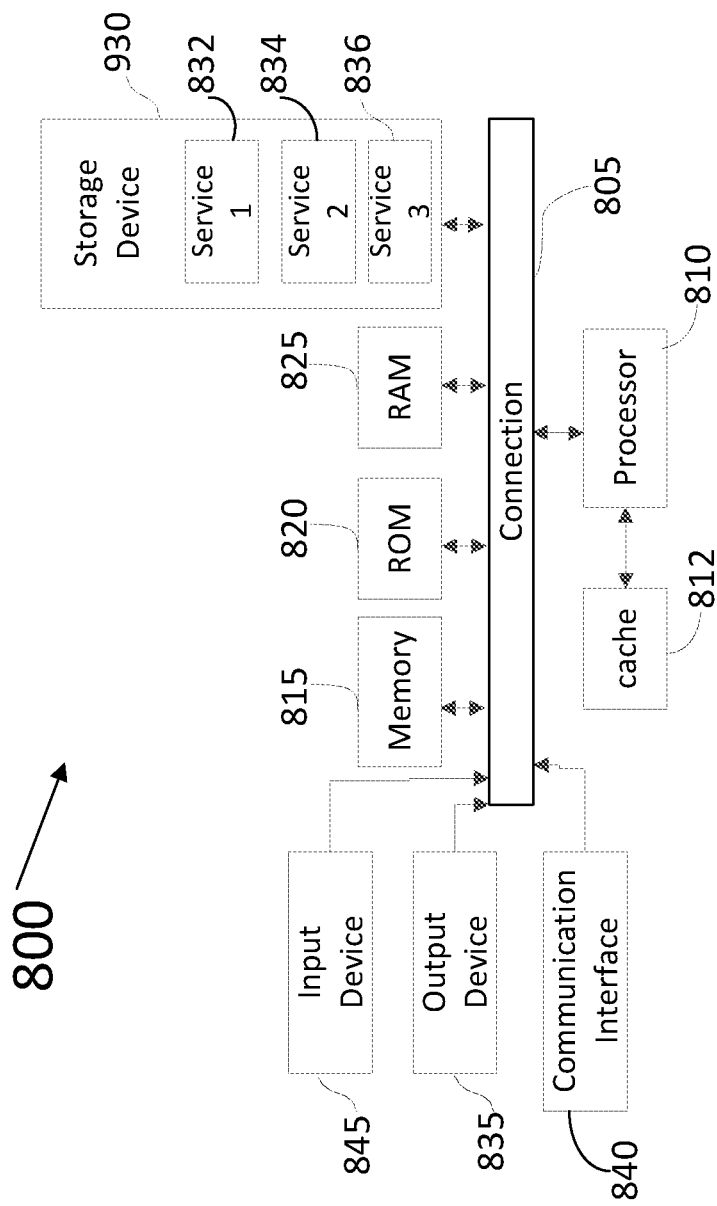
FIG. 8 shows an example of a computing system in accordance with some aspects of the disclosed technology.

FIG. 8 shows an example of computing system 800, which can be for example any computing device making up any of the entities illustrated in FIG. 3, FIG. 4, or FIG. 6, for examples, controller 302, 402, or 602, or any component thereof in which the components of the system are in communication with each other using connection 805. Connection 805 can be a physical connection via a bus, or a direct connection into processor 810, such as in a chipset architecture. Connection 805 can also be a virtual, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

An example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, close to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of many output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 830 can include software services, servers, services, etc., and when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for reducing power consumption in a night mode for a security camera, the method comprising: determining exposure frame parameters for an image frame of an image sensor of the security camera, and synchronizing an activation of the one or more LEDs to occur during the exposure frame, but not during a vertical blanking period of the image frame.

Aspect 2. The method of Aspect 1, further includes generating a plurality of IR pulses of high current by an AEC comprising a pulse generator; determining latency between an exposure frame of an image sensor and a first of the plurality of IR pulses; and synchronizing the plurality of IR pulses with one or more exposure frames of the image sensor based on the latency, wherein the plurality of IR pulses is evenly spaced to obtain a constant number of IR pulses within the exposure frames, wherein the switch transistor is configured to switch in nanoseconds and allows the high current to pass through.

Aspect 3. The method of any of Aspects 1 to 2, wherein the synchronizing the plurality of IR pulses with one or more exposure frames of the image sensor comprises aligning a beginning of sensor exposure of the one or more exposure frames of the image sensor with the first one of the plurality of IR pulses.

Aspect 4. The method of any of Aspects 1 to 3, wherein the pulse generator comprises a first pulse generator configured to generate a first subset of the plurality of pulses having a first frequency and a second pulse generator configured to generate a second subset of the plurality of pulses having a second frequency with a first shift from the first subset of the plurality of pulses. In some variations, the pulse generator may comprise a third pulse generator configured to generate a third subset of the plurality of pulses having a third frequency with a second shift from the second subset of the plurality of pulses. In some variations, the pulse generator may include any number of pulse generators having any number of frequencies and any number of subsets of pulses with any number of shifts.

Aspect 5. The method of any of Aspects 1 to 4, wherein the plurality of pulses has a constant width of the pulses and spaced adequately with a minimum period to allow cooling of the LEDs.

Aspect 6. The method of any of Aspects 1 to 5 further includes increasing the number of pulses when the size of the exposure frames increases or decreasing the number of pulses when the size of the exposure frames decreases.

Aspect 7. The method of any of Aspects 1 to 6, further includes disabling the pulses during vertical blanking of the image sensor.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A system for reducing infrared (IR) light emitting diode (LED) power in a night mode for LED operations, the system comprising:
   an input power source;
   one or more LEDs coupled to the input power source;
   an auto-exposure controller (AEC) coupled to one or more LEDs; and
   one or more transistor switches coupled between the one or more LEDs and the AEC,
   wherein the AEC is coupled to an image sensor of an imaging system and configures attributes of exposure frames for the image sensor, the attributes comprising a beginning of sensor exposure and an end of sensor exposure for image frames captured by the image sensor;
   wherein the AEC is configured to generate a plurality of pulses that control the one or more transistor switches, different subsets of the plurality of pulses having different frequencies,
   wherein the AEC is configured to synchronize an activation of the one or more LEDs to occur during the exposure frame and disables the activation of one or more LEDs during vertical blanking periods of the image frames,
   wherein the one or more transistor switches are configured to switch the power of the one or more LEDs for a time measured in nanoseconds and allow a high current to pass through the one or more LEDs causing the one or more LEDs to produce a pulse of light during the exposure frames,
   wherein the AEC is configured to synchronize a first of the plurality of pulses with the beginning of the sensor exposure of one or more of the exposure frames based on latency between the image sensor and a pulse generator;
   wherein the pulse generator comprises a first pulse generator configured to generate a first subset of the plurality of pulses having a first frequency with and a second pulse generator configured to generate a second subset of the plurality of pulses having a second frequency with a shift from the first subset of the plurality of pulses.

2. The system of claim 1, further comprising one or more buffers coupled between the AEC and the one or more LEDs for changing the current and/or voltage from the pulse generator.

3. The system of claim 1, further comprising one or more voltage converters coupled to one or more LEDs, wherein the one or more voltage converters are coupled to the input power source to convert the voltage from an input voltage to a voltage that activates the one or more LEDs.

4. The system of claim 3, wherein the input power source comprises one alternating current (AC) power source, a direct current (DC) power source, or a power-over-internet (POE) adapter.

5. The system of claim 4, wherein the high current combined with the plurality of pluses provides each of the one or more LEDs adequate power.

6. The system of claim 1, wherein the high current ranges from 5 A to 10 A.

7. The system of claim 1, wherein the plurality of pulses is evenly spaced to obtain a constant number of pulses within the exposure frames.

8. The system of claim 1, wherein the plurality of pulses has a constant width of the pulses and spaced adequately to allow cooling of the LEDs.

9. The system of claim 1, wherein the imaging system comprises a security camera or a security video.

10. The system of claim 1, wherein the one or more transistor switches comprise n-channel metal-oxide-semiconductor (NMOS) transistors metal-oxide-semiconductor field-effect transistors (MOSFETs).

11. A method for reducing power consumption in a night mode for a security camera, the method comprising:
  determining exposure frame parameters for an image frame of an image sensor of the security camera;
  generating a plurality of IR pulses, different subsets of the plurality of pulses having different frequencies; and
  using the plurality of IR pulses, synchronizing an activation of one or more LEDs to occur during the exposure frame, but not during a vertical blanking period of the image frame,
  generating the plurality of IR pulses of high current by an AEC comprising a pulse generator;
  determining latency between an exposure frame of an image sensor and a first of the plurality of IR pulses; and
  synchronizing the plurality of IR pulses with one or more exposure frames of the image sensor based on the latency,
  wherein the plurality of IR pulses is evenly spaced to obtain a constant number of IR pulses within the exposure frames,
  wherein a switch transistor is configured to switch in nanoseconds and allows the high current to pass through,
  wherein the synchronizing the plurality of IR pulses with one or more exposure frames of the image sensor comprises aligning a beginning of sensor exposure of the one or more exposure frames of the image sensor with the first one of the plurality of IR pulses,
  wherein the pulse generator comprises a first pulse generator configured to generate a first subset of the plurality of pulses having a first frequency and a second pulse generator configured to generate a second subset of the plurality of pulses having a second frequency.

12. The method of claim 11, wherein the plurality of pulses has a constant width of the pulses and spaced adequately with a minimum period to allow cooling of the LEDs.

13. The method of claim 11, further comprising increasing a number of pulses when a size of the exposure frames increases or decreasing the number of pulses when the size of the exposure frames decreases.

14. The method of claim 11, further comprising disabling the pulses during vertical blanking of the image sensor.

* * * * *